United States Patent
Arnold et al.

(10) Patent No.: US 9,252,667 B2
(45) Date of Patent: Feb. 2, 2016

(54) ELECTROMECHANICAL INDUCTORS AND TRANSFORMERS

(71) Applicant: UNIVERSITY OF FLORIDA RESEARCH FOUNDATION, INCORPORATED, Gainesville, FL (US)

(72) Inventors: David Patrick Arnold, Gainesville, FL (US); Shuo Cheng, Gainesville, FL (US); Christopher David Meyer, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 14/096,099

(22) Filed: Dec. 4, 2013

(65) Prior Publication Data

US 2014/0092633 A1     Apr. 3, 2014

Related U.S. Application Data

(62) Division of application No. 13/263,444, filed as application No. PCT/US2010/027086 on Mar. 12, 2010, now Pat. No. 8,624,700.

(60) Provisional application No. 61/186,589, filed on Jun. 12, 2009.

(51) Int. Cl.
*H01F 5/00* (2006.01)
*H02M 3/22* (2006.01) *H01F 29/10* (2006.01)
*H02M 3/155* (2006.01)

(52) U.S. Cl.
CPC . *H02M 3/22* (2013.01); *H01F 5/00* (2013.01); *H01F 29/10* (2013.01); *H02M 3/155* (2013.01)

(58) Field of Classification Search
CPC ................. H01F 5/00; H01F 27/00–27/30
USPC ............... 363/16–21; 336/65, 83, 200, 232
See application file for complete search history.

(56) References Cited

U.S. PATENT DOCUMENTS

| | | |
|---|---|---|
| 4,737,698 A | 4/1988 | McMullin et al. |
| 4,864,236 A | 9/1989 | Gibson et al. |

(Continued)

FOREIGN PATENT DOCUMENTS

| | | | |
|---|---|---|---|
| EP | 2264875 A1 | * | 12/2010 |
| JP | 05-013234 A | | 1/1993 |

(Continued)

OTHER PUBLICATIONS

Bowers, B.J., et al., "A Method to Form Bonded Micromagnets Embedded in Silicon," Tech. Dig. 14th Int. Conf. Solid State Sensors, Actuators, and Microsystems, Jun. 2007, vol. 2, pp. 1581-1584.

(Continued)

*Primary Examiner* — Tuyen Nguyen
(74) *Attorney, Agent, or Firm* — Saliwanchik, Lloyd & Eisenschenk

(57) ABSTRACT

Devices and systems for power electronic circuits are provided. Embodiments of the present invention enable high density inductive energy storage by using electromechanical coupling between an electrically conducting inductive element and a mechanical resonator to passively store energy via both electromagnetic and mechanical mechanisms. A microelectromechanical inductor (MEMI) is provided utilizing a magnet and a conductor. In a specific embodiment, the MEMI includes a permanent magnet on a compliant layer centrally disposed within a spiral coil. In a further embodiment, a second coil is provided near the magnet to provide a resonating transducer.

19 Claims, 12 Drawing Sheets

(56) References Cited

U.S. PATENT DOCUMENTS

| | | | |
|---|---|---|---|
| 5,073,849 A * | 12/1991 | Morris | 363/21.03 |
| 6,490,177 B1 * | 12/2002 | Figueroa | 363/21.03 |
| 2005/0211515 A1 * | 9/2005 | Hata et al. | 188/266.7 |
| 2005/0285703 A1 | 12/2005 | Wheeler et al. | |
| 2006/0152785 A1 * | 7/2006 | Yasuda et al. | 359/199 |
| 2008/0191678 A1 * | 8/2008 | Feldtkeller et al. | 323/282 |
| 2008/0252268 A1 * | 10/2008 | Feldtkeller et al. | 323/207 |

FOREIGN PATENT DOCUMENTS

| | | |
|---|---|---|
| JP | 07-320935 A | 12/1995 |
| JP | 08-166289 A | 6/1996 |
| JP | 09-129449 A | 5/1997 |
| JP | 2000-152379 A | 5/2000 |
| JP | 2003-274487 A | 9/2003 |
| KR | 10-2009-0048678 A | 5/2009 |
| SU | 1770972 A1 * | 10/1992 |

OTHER PUBLICATIONS

Wang, N., et al., "Wax-bonded NdFeB micromagnets for microelectromechanical systems applications," Journal of Applied Physics, 2008, vol. 103, 07E109.

* cited by examiner

ELECTROMECHANICAL INDUCTORS AND TRANSFORMERS

CROSS-REFERENCE TO RELATED APPLICATIONS

This application is a divisional of U.S. application Ser. No. 13/263,444, filed Oct. 7, 2011, which is the U.S. national stage application of International Application Serial No. PCT/US10/27086, filed Mar. 12, 2010, which claims the benefit of U.S. Provisional Application Ser. No. 61/865,589, filed Jun. 12, 2009, which are hereby incorporated by reference in their entirety, including all figures, tables and drawings.

BACKGROUND OF INVENTION

Magnetic inductors and transformers are often the bulkiest, costliest, and most inefficient components in a power system. These components can limit the size and performance of a power system, and thus a larger system as a whole. In mobile, wireless, or autonomous devices, size and efficiency play an even more prominent role. For example, the power supply of an unmanned aerial vehicle (UAV) limits both mission duration and useful payload. Additionally, many consumer electronic devices demand small, efficient power supplies to enhance mobility and useful lifespan between battery recharging/replacement. Since most existing portable systems rely on dc primary power sources (such as batteries, fuel cells, and solar cells), switch-mode dc:dc power converters are commonly used to step up or down the voltage levels for various electronic subsystems. Thus, size reduction of these circuits is critical to enhance mobility and stealth.

To deliver clean, stable voltages from relatively unstable sources such as batteries or energy harvesting devices, switch-mode dc:dc power converters currently provide the highest power conversion efficiency, typically 80-95%, in the smallest form factor (dimensions). These converters employ solid-state switches (transistors and diodes) and passive energy storage elements (inductors or capacitors) to temporarily store energy from the input and then deliver the stored energy to the output at a different voltage. A standard switched-inductor boost converter is shown in FIG. 1. Referring to FIG. 1, the converter includes a transistor switch $S_1$, a diode $D_1$, an inductor $L_1$, and a capacitor $C_1$. When the transistor switch $S_1$ is closed, magnetic energy builds in the inductor $L_1$; when the switch $S_1$ is opened, that energy is dumped onto the load $R_L$. The diode $D_1$ is used to prevent current backflow, and the capacitor $C_1$ smoothes the ripple on the load $R_L$. The output load voltage Vo is controlled by the percentage of time that the switch $S_1$ is closed (i.e. the duty cycle). Standard switching speeds for commercial off-the-shelf (COTS) power converters are currently in the 100 kHz-10 MHz range.

The size and efficiency of switch-mode dc:dc converters are currently limited by the required passive components (inductors/capacitors). While the physics of semiconductor devices have enabled extreme size-reduction of solid-state devices (i.e. Moore's Law), electrical passive elements have not benefited from the same favorable scaling. Currently the silicon electronics of a dc:dc converter can be made much smaller than the required passives, which must be capable of storing a certain amount of energy. Thus, while small power IC chips are commercially available, off-chip inductors and capacitors are typically required to realize a functional power converter. For example, one related art silicon-based dc:dc buck regulator is available with a co-packaged inductor in a 3×3×1.1 $mm^3$ package. However, the inductor dominates the package volume, and the two external capacitors used for this regulator doubles the total solution volume/mass.

To enable physically smaller passive elements, the switching frequency of the electronics can be increased. Higher switching frequencies can be used to reduce the physical size of the passive elements, since less energy must be stored per cycle to maintain the same energy transfer rate (power) at higher switching speeds. However, higher switching frequencies lead to higher power losses in both the electronics and the passive elements, and thus lower overall efficiencies. For example, with current technologies, frequencies in excess of 10-100 MHz are required to enable the passive elements to shrink to a size comparable to that of the silicon-based IC portion. At these frequencies, transistor switching losses begin to limit the overall efficiency. Additionally, frequency-dependent power losses in magnetic materials present roadblocks for realizing high-Q inductors, which again limits efficiency. Thus, existing size and performance limitations of electrical passive elements inhibit the realization of single-chip power converter solutions.

To meet the needs for fully-integrated power converter solutions, both energy density and process integrability must be addressed. Monolithic integration (fabrication of passive elements directly on the silicon) or co-packaging (interconnecting separate passive and silicon components within a package) are of equal interest, so long as high performance is achieved with small mass and volume. Accordingly, research is being conducted to achieve sufficient inductance and capacitance in a small enough form factor to enable for integration with the silicon electronics.

Researchers are actively exploring new materials and micro/nanofabrication solutions for achieving high-energy-density, low-loss inductors and capacitors. For capacitors, much attention has been focused on high-permittivity dielectrics, nanoscale dielectric gaps, and/or high-surface-area electrodes to increase the net capacitance. For example, deep trenches in silicon are being explored to increase capacitance density.

For inductors, however, there continues to be difficulties in achieving both the high inductances and high quality factors used to maintain overall converter efficiency. High permeability soft magnetic cores have attracted the most attention as means for increasing the inductance density, since the inductance ideally scales proportional with the relative permeability. While suitable magnetic films have exhibited relative permeabilities of 200-1000 in the MHz range, actual microfabricated inductors have not attained such a performance gain. This shortfall has been attributed to geometric demagnetization effects, surface defects that inhibit domain wall motion, and the difficulties in achieving fully-closed magnetic cores.

For inductors, the quality factor (the ratio of energy stored to energy lost per cycle, where $Q=\omega L/R$) presents another major design challenge. In microscale inductors, thick electroplated coil windings are used to mitigate conduction losses, but the use of magnetic materials introduces additional power loss mechanisms, including hysteresis, eddy current, and excess loss in the magnetic cores. This additional loss is weighed against the inductance benefit offered by the magnetic core when designing the inductor. In particular, if a magnetic core introduces more energy loss than energy storage, the Q will be less than that of an air core.

The use of magnetic cores becomes more challenging as the switching frequency is increased because the magnetic eddy current losses scale quadratically with frequency. For example, one microfabricated high-inductance-density inductor using high permeability soft magnetic cores exhibited a maximum Q of only 8 at 40 MHz. For comparison, small surface-mount air-core inductors commonly used in power converter circuits typically have Q's in excess of 100. Thus, there exists a need in the art for inductor structures that exhibit high inductance density and high Q.

BRIEF SUMMARY

An embodiment of the present invention provides devices and systems for power electronic circuits. Embodiments of the present invention enable high density inductive energy storage by using electromechanical coupling between an electrically conducting inductive element and a mechanical resonator to passively store energy via both electromagnetic and mechanical mechanisms. As opposed to traditional magnetic core inductors, ultra high energy density and high Q are achieved in devices according to embodiments of the present invention via kinetic energy storage, thus avoiding the magnetic loss mechanisms and efficiency penalties associated with magnetic cores. In accordance with one embodiment of the present invention, the beneficial energy storage occurs over a limited frequency range, near the coupled system resonance. For switch-mode power converters, this is acceptable because switch-mode power converter circuits tend to operate at a constant switching frequency.

In one embodiment, a resonating inductor element is provided. The subject inductor can be achieved through electromechanical energy storage elements. In a further embodiment, the subject inductor can enhance the performance and reduce the size/mass of switch-mode dc:dc power supplies for small-scale (<100 W) power systems. In yet a further embodiment, the subject inductor can be designed to exhibit extreme inductance density (>100 µH/mm$^2$) and low loss in the 50 kHz-50 MHz range. Applications of the subject inductors include ultra-miniaturized, single-chip power converters with order-of-magnitude size/mass reduction compared to the existing state-of-the art.

In a further embodiment, a resonating transformer element is provided. The subject transformer can be achieved through a combination of a resonating inductor element having electromechanical energy storage elements and a second coil in which a voltage is induced by the resonating inductor element.

The subject devices can be manufactured via bulk microfabrication, augmenting existing micro-inductor process technologies. This enables co-integration or co-fabrication with silicon power IC's. Moreover, by appropriate design and material selection, the system resonance can be tuned from the low kHz to high MHz range or possibly higher.

BRIEF DESCRIPTION OF DRAWINGS

FIG. 2A shows a planar view; FIG. 2B shows a cross-sectional view along line I-I'; FIG. 2C shows a cross-sectional view along line I-I' for one implementation; and FIG. 2D shows a cross-sectional view along line I-I' for another implementation.

FIG. 6A shows an equivalent circuit of the resonating transformer in the mechanical domain; FIG. 6B shows an equivalent circuit of the resonating transformer in the electrical domain; and FIG. 6C shows an equivalent circuit of the resonating transformer in the magnetic domain.

FIG. 7A shows a planar view and FIG. 7B shows a cross-sectional view along line A-A'.

FIG. 9A shows a planar view and FIG. 9B shows a cross-sectional view along line B-B'.

FIG. 10A shows a planar view and FIG. 10B shows a cross-sectional view along line C-C'.

DETAILED DISCLOSURE

Figure 1:
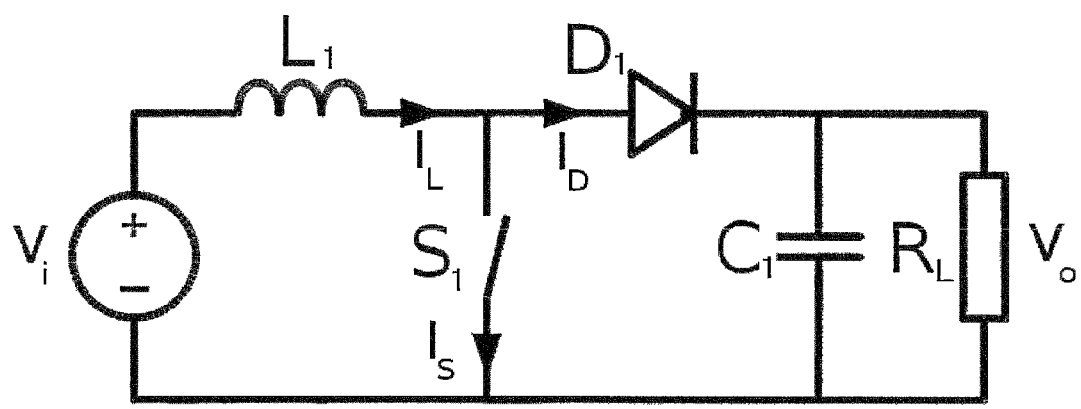
FIG. 1 shows a conventional switched-inductor boost converter.

Embodiments of the present invention can be used to provide power electronic circuits, including dc:dc converters, for portable electronic devices. Applications for embodiments of the present invention include supportive power systems such as dc:dc convertors for ultra lightweight, mobile, and covert systems. For example, numerous defense-related systems demand portable, wireless, and/or autonomous operation in highly constrained form factors with extremely limited energy resources. Examples of such systems include robotics, UAV's, unattended sensors, portable electronics, tracking devices, and satellites. The mass and volume required by power sources and power management circuits play a large role in the overall system design. Therefore, by increasing the power density and efficiency of supportive power systems, embodiments of the present invention enable further miniaturization of a variety of portable electronic devices that rely on batteries or energy harvesting devices for power.

In addition to converter applications, embodiments of the present invention can be used in resonant gate drivers and as coupled inductors (transformers) for other power electronic applications.

According to an embodiment, a resonating inductor is provided by inductively coupling an inductor to a mechanical resonator to boost the energy storage of a device by employing electromagnetic and mechanical energy storage. Accordingly, the inductance can be electromechanically boosted without the loss mechanisms associated with magnetic cores. In a further embodiment, a second inductively coupled inductor is included to provide a resonating transformer.

The energy density of different energy storage mechanisms are provided, as summarized in Table 1.

TABLE 1

| | Lumped Energy Equation | Energy Density Equation | Material Limiting Factor | Theoretical Limit (J/m³) |
|---|---|---|---|---|
| Electric Energy (potential) | $\frac{1}{2}CV^2$ | $\frac{1}{2}\varepsilon_0\varepsilon_r E^2$ | Dielectric Breakdown | ~$10^7$ |
| Magnetic Energy (kinetic) | $\frac{1}{2}Li^2$ | $\frac{1}{2}\mu_0\mu_r H^2$ | Magnetic Saturation | ~$10^4$ |
| Strain Energy (potential) | $\frac{1}{2}kx^2$ | $\frac{1}{2}Y\varepsilon^2$ | Yield or Fracture | ~$10^7$ |
| Inertial Energy (kinetic) | $\frac{1}{2}mv^2$ | $\frac{1}{2}\rho_m v^2$ | Yield or Fracture | ~$10^8$ |

Electromagnetic energy (electric and magnetic energy) storage is well understood and ubiquitously employed for electrical inductors and capacitors. Potential energy storage via an electric field is generally limited by the dielectric strength of the dielectric material; similarly, kinetic energy storage via magnetic fields is usually limited by the saturation of magnetic materials. In practice, these theoretical energy density limits can often be achieved because of the relative ease of creating strong electric and magnetic fields.

In contrast, mechanical energy (strain and inertial energy) storage of electrical energy is not as widespread, despite its potential for higher energy densities. Similar to electromagnetic energy storage, the theoretical limits of mechanical energy storage are limited by material properties, such as the yield or fracture strength. One challenge for mechanical energy storage is achieving large strain/inertial energy uniformly throughout a material volume. Uniaxial loading can be used to impart uniform strain, but this usually requires large forces. Alternatively, bending or torsion can be used to concentrate the strain in a small region of the total material volume. Regardless of the approach, if even a small fraction of the theoretical energy density limits can be reached, there exists the possibility for very large energy storage.

While mechanical energy storage may not be practical for addressing many macroscale energy storage problems that require large amounts of energy storage for long durations of time, mechanical storage can be used to address problems involving small storage systems in accordance with an embodiment of the present invention. For example, switching power converters involve small storage problems (the magnitude of energy is usually small) and the energy storage is periodic at a known cyclical frequency. Accordingly, the incorporation of mechanical energy storage in accordance with the invention can be used to address the needs of switching power converter.

According to an embodiment, electromechanical devices are provided that employ magnetic energy storage plus strain energy storage. In one embodiment, a resonating inductor can be provided by a combination conductor and magnet. The subject electromechanical device can be configured as a microelectromechanical inductor (MEMI).

Figure 2A:
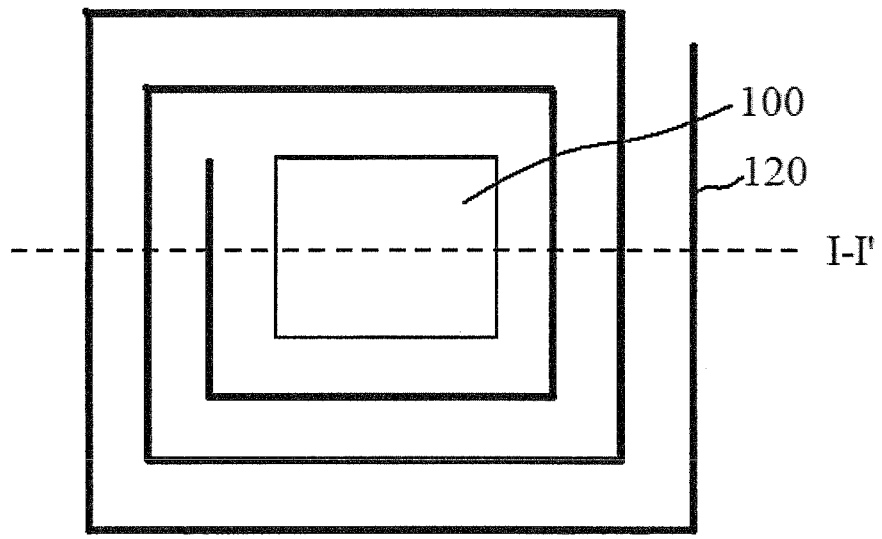
FIGS. 2A-2D show a conceptual view of a resonating inductor in accordance with an embodiment of the present invention.
Figure 2B:
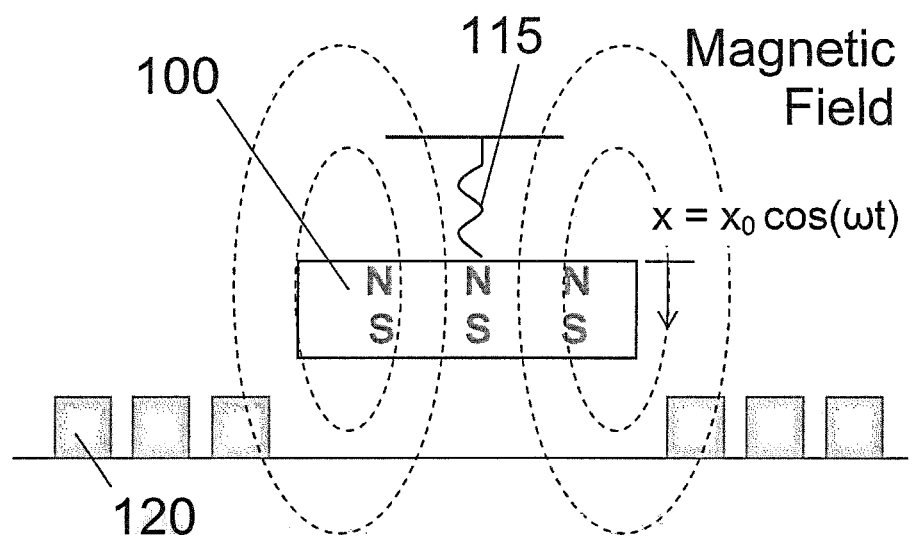
Figure 2C:
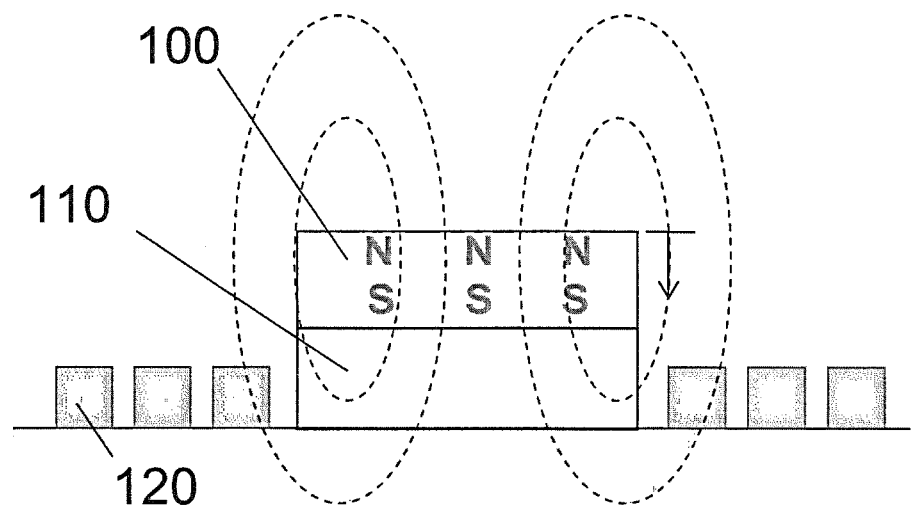
Figure 2D:
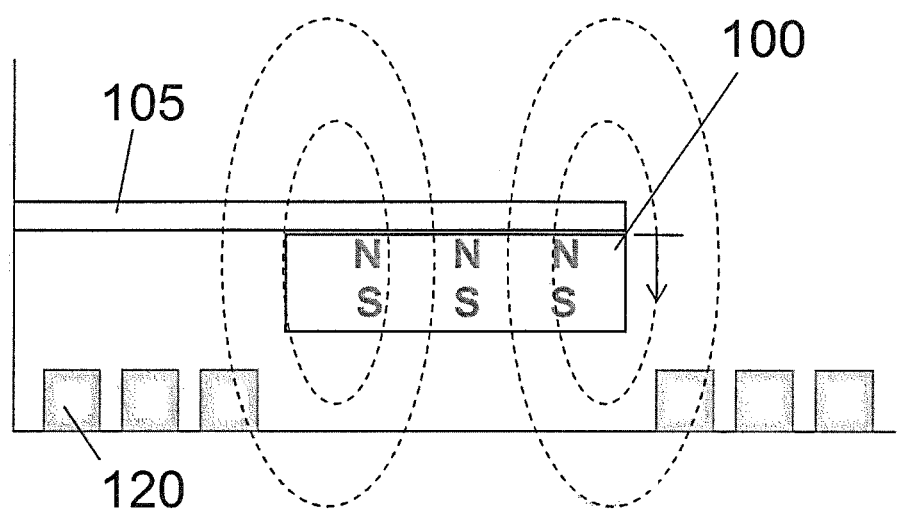

The self-inductance (L) of an inductor is given by the ratio of magnetic flux linkage (number of coil terms (N) times magnetic flux ($\Phi$)) and input current (i), $L=N\Phi/i$. In a standard inductor, current flows in the coil, and the resulting magnetic flux is dependent on the magnetic properties of the materials comprising the core. In contrast, embodiments of the present invention incorporate a resonating inductor. FIGS. 2A and 2B show a planar and cross-sectional view, respectively, of a resonating inductor in accordance with an embodiment of the present invention. The resonating inductor includes a conductor and magnet. Referring to FIG. 2B, magnetic material 100 can be arranged to move with respect to a planar spiral coil 120, which functions as the conductor. A spring 115 or compliant mechanism can be used to allow movement of the magnetic material 100. According to one implementation as shown in FIG. 2C, the magnetic material 100 sits on a compliant layer 110 at the center of a planar spiral coil 120. The compliant layer 110 can include an elastomer such as polydimethylsiloxane (PDMS). In another embodiment, the compliant layer 110 includes carbon nanotubes. According to another implementation as shown in FIG. 2D, the magnetic material 100 is fixed to a flexure 105 (or beam) and disposed over the coil 120. The flexure 105 (or beam) can extend from a sidewall as a cantilever.

In operation, when current flows in the coil 120, a magnetic force attracts or repels the magnetic material 100, depending on the direction of current. The resulting motion acts to increase or decrease the flux in the coil 120, resulting in an apparent boost in inductance. The displacement may conform to $x=x_0\cos(\omega t)$. Moreover, if the current is cycled near the resonant frequency of the mechanical resonator, large displacements will occur (proportional to the mechanical Q), resulting in a very large inductance boost. In certain embodiments, the magnetic material includes ferrite, NdFeB, SmCo, Alnico, Fe alloys, Co alloys, or Ni alloys. In a specific embodiment, the magnetic material 100 can be a permanent magnet. When using a permanent magnet, the magnet magnetization remains effectively fixed, and there are no major magnetic losses. However, embodiments are not limited to permanent magnets. For example, the magnetic material 100 can include a soft magnet.

Though FIGS. 2A-2D depict a single-layer spiral coil and FIG. 2C depicts the magnet sitting atop a compliant layer, embodiments are not limited thereto. For example, one or more magnets can be fixed on a substrate, and the coil can be permitted to move (see e.g., FIGS. 11A, 11B, and 12). In another embodiment, different winding patterns can be utilized for the conductor instead of a spiral coil winding pattern. In addition, the conductor can be provided having no winding patterns. For example, a conductor having a straight, curved, or staggered shape can be used in place of the coil. According to embodiments, the conductor can be of any material capable of creating a magnetic field to interact with the magnetic material.

In further embodiments, flexures can be used to enable translational or rotational vibration modes between the magnet and conductor. Additionally, high strain-density materials, such as carbon nanotubes can be integrated in the device.

Figure 3:
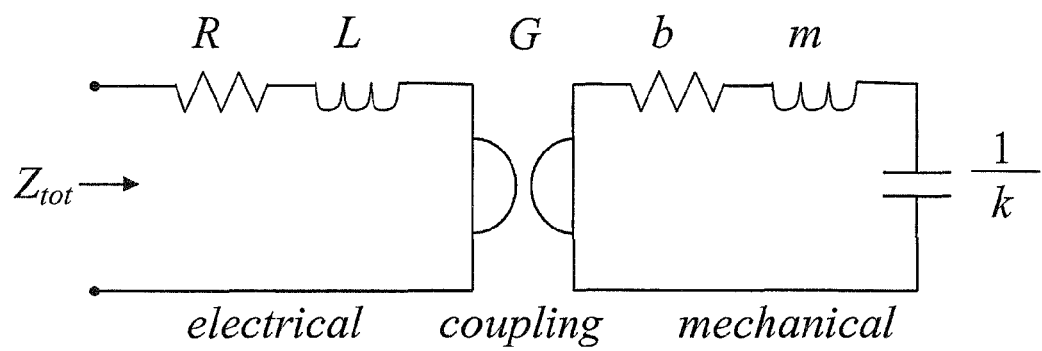
FIG. 3 shows an equivalent circuit diagram for a resonating inductor in accordance with an embodiment of the present invention.

The coupled system dynamics can be modeled to first-order using lumped electromechanical analysis tools. An equivalent circuit representing the system behavior is shown in FIG. 3. The electrical side contains the electrical coil resistance (R) and inductance (L). The mechanical side contains an RLC-network representing the effective mass (m), compliance (1/k), and damping (b) of the mechanical resonator. The two energy domains are coupled using an electrical gyrator (G) that models the electrodynamic coupling between the magnet 100 and coil 120. Equation (1) below provides the total impedance ($Z_{tot}$) of the system.

$$Z_{tot} = \underbrace{R + \frac{G^2 b\omega^2}{(k-m\omega^2)^2 + b^2\omega^2}}_{R_{tot}} + \underbrace{j\omega\left\{L + \frac{G^2(k-m\omega^2)}{(k-m\omega^2)^2 + b^2\omega^2}\right\}}_{L_{tot}} \quad (1)$$

Figure 4:
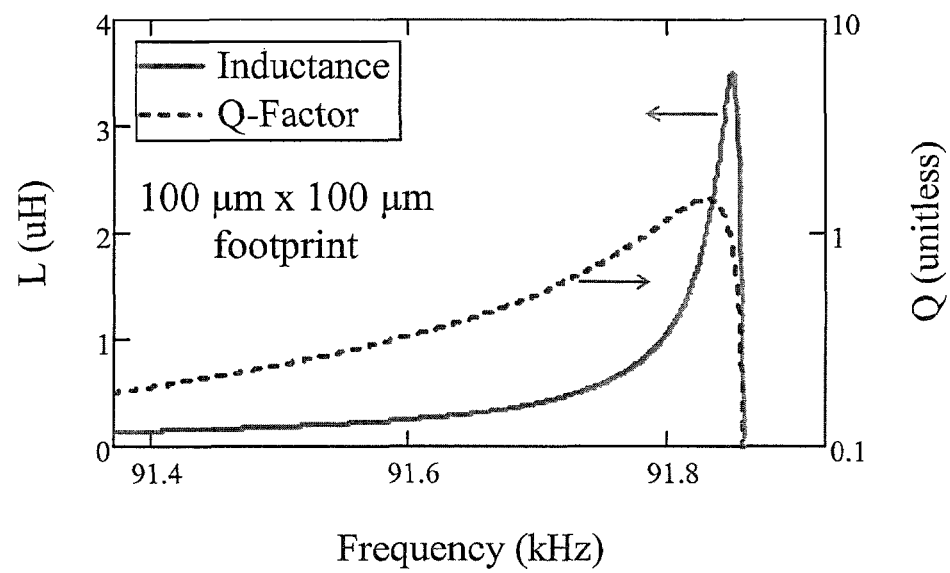
FIG. 4 shows a plot illustrating inductance and Q-factor for a resonating inductor having a 100 µm×100 µm footprint in accordance with an embodiment of the present invention.

FIG. 4 shows an example plot of the predicted inductance and Q-factor for one concept resonating inductor design, such as a MEMI with a 100 µm×100 µm footprint. The data indicates increasing performance vs. frequency, with a sharp electromechanical resonance at 91.9 kHz. Just below the resonance, an inductance of 2 µH is observed with Q=1.5. Just above the resonance, the electrical load becomes capacitive, but above 93 kHz, it is again inductive. The data indicates a 500× boost over the low-frequency inductance of 4 nH. The inductance density of >200 µH/mm$^2$ represents a two order-of-magnitude improvement over the state-of-the-art. The relatively low Q is a consequence of the modest operating frequency and limited electromechanical coupling. Higher Q's are possible by optimizing the design. It should be noted that the results presented in FIG. 4 are for illustrative purposes and should not be construed as limiting.

Devices in accordance with embodiments of the present invention can be fabricated to provide microscale structures capable of integration with silicon electronics. The microfabrication can provide physical dimensions at a size enabling high-Q mechanical structures with resonant frequencies in the kHz-MHz range, which are in line with the converter switching speeds. Though microfabrication is described herein, embodiments are not limited to micro-scale feature sizes. For example, the subject resonating inductor can be larger or smaller than described herein.

In one example microfabrication implementation, the spiral coil inductor windings can be formed through electroplating a copper coil as described by Arnold et al. in "Magnetic induction machines integrated into bulk-micromachined silicon," *J. Microelectromech. Syst.*, vol. 15, no. 2, pp. 406-414, April 2006; and by Bowers et al. in "A method to form bonded micromagnets embedded in silicon," Tech. Dig. 14$^{th}$ Int. Conf. Solid-State Sensors, Actuators, and Microsystems (Transducers '07), Lyon, France, June 2007, vol. 2, pp. 1581-1584). In addition, the permanent micromagnet can be formed in accordance with Wang et al. in "Wax-bonded NdFeB micromagnets for microelectromechanical systems applications," *J. Appl. Phys.*, vol. 103, no. 7, pp. 07E109-1-3, April 2008.

According to a further embodiment, a second conductor is positioned nearby to the magnet of the resonating inductor to provide a resonating transformer. Electrical energy from the circuit having the resonating inductor can then be transferred to a circuit having the second conductor. Current flowing in the first conductor attracts or repels the magnetic material of the resonating inductor, which generates an oscillating magnetic field and varies the flux in the first conductor. The second conductor positioned near the first conductor can pick up the energy generated by the resonating inductor.

The leakage inductance of the second conductor can be used in combination with external capacitors to create one or more resonant circuits.

For conventional transformers, an efficiency trade-off occurs based on the transformer's operating frequency. In particular, because the magnetizing reactance $X_M$ is proportional to frequency, low frequency operation indicates a smaller $X_M$. A small $X_M$ indicates small total impedance looking in to the primary winding. For a given primary side input voltage $V_P$, this means higher current through primary coil equivalent circuit resistor $R_P$, and more copper loss to the winding. Moreover, since the ratio between magnetizing branch impedance (of the parallel equivalent circuit magnetizing resistance $R_c$ and magnetizing reactance $X_M$) and the primary winding impedance ($R_P+X_P$) is reduced, the voltage across $X_M$ is reduced, which means less power transferred to magnetic core.

For high frequency operation, the power transfer to the magnetic core can be improved. However, the hysteresis loss and eddy current loss all increase with frequency. In addition, skin depth of the primary coil reduces, which also increases copper loss to the winding.

It is generally desirable to maximize the magnetizing reactance in order to minimize the magnetizing current required to establish flux in the magnetic core. However, in practice, low frequency is preferred when efficiency is the key because the low magnetizing reactance problem can be solved by increasing the magnetizing inductance. In order to increase the magnetizing inductance, conventional transformers utilize solutions resulting in higher volume and weight to the transformer. In most power distribution applications, size and weight are not an issue. Therefore, bigger sized transformers are used, resulting in >95% efficiency. Even higher efficiency can be achieved when a superconductor is used.

However, when size and weight matters, increasing the magnetizing inductance is not feasible, and a higher frequency is required to increase the magnetizing reactance. In some applications radio frequency is used to achieve high magnetizing reactance. To reduce high frequency associated loss, air core transformers are used to substantially avoid hysteresis loss and eddy current loss. However, to avoid the hysteresis and eddy current loss present air core transformers operate at frequencies in the MHz to GHz range, and the power is radiative, which creates a safety issue as well as electromagnetic interference.

Therefore, given that the magnetizing reactance is high enough, low frequency operation is desired to minimize core loss due to hysteresis and eddy current, and copper loss due to reduced conductor skin depth. By introducing resonance in accordance with embodiments of the present invention, the magnetizing reactance $X_M$ can be canceled by the impedance of a capacitor, resulting in effectively infinite magnetizing reactance. According to certain embodiments, this magnetizing reactance cancellation can be implemented without significantly increasing the size of the overall device.

Figure 5:
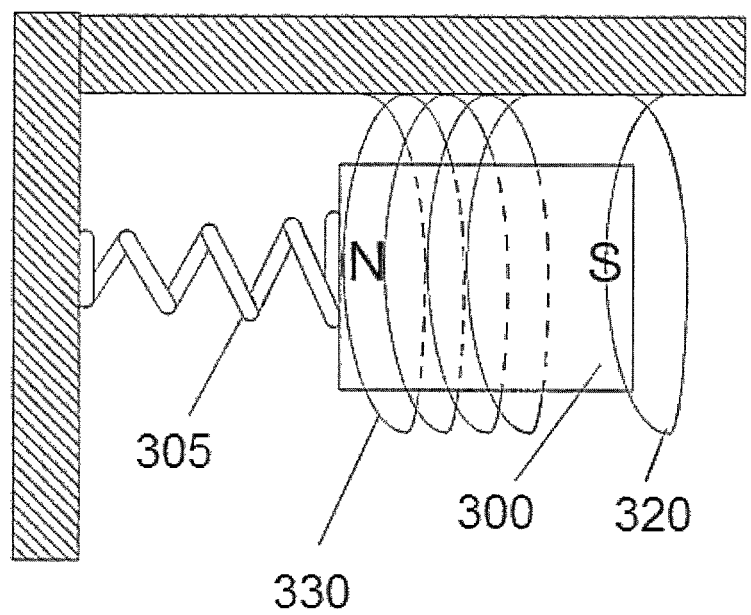
FIG. 5 shows a representation of a resonating transformer in accordance with an embodiment of the present invention.

In wireless power transmission, an additional capacitively loaded winding is used to cancel the magnetizing reactance $X_M$ at resonant frequency. In contrast, an embodiment of the present invention uses movement between a magnet and the coils. As an example where the magnet is a moving magnet, ac current in a primary coil can cause the magnet to move, creating a time varying magnetic flux. The movement of the magnet (and creating of the time varying magnetic flux) induces voltage in the secondary coil. In the mechanical domain, resonance can be implemented by connecting a spring to the moving magnet, such as shown in FIG. 5. Referring to FIG. 5, a magnet 300 attached to a spring 305 is caused to move (or resonate) by an ac current in the first coil 320, which induces voltage in the second coil 330. The spring 305 may take a variety of forms and shapes. Alternatively, a cantilever arrangement can be used.

Figure 6A:
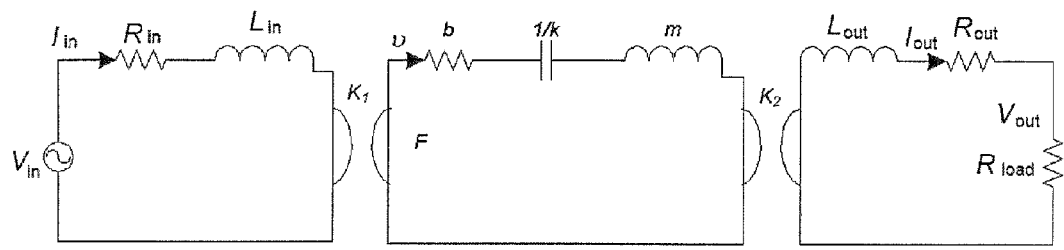
FIGS. 6A-6C show a equivalent circuit diagrams of a resonating transformer in accordance with an embodiment of the present invention.
Figure 6B:
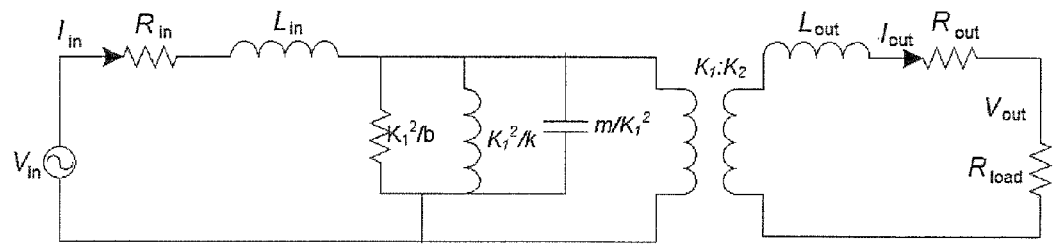
Figure 6C:
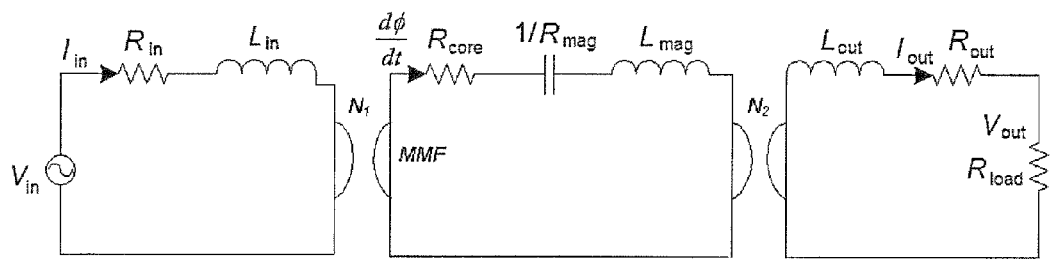

FIG. 6A shows the equivalent circuit model for the mechanical domain. FIG. 6B shows the equivalent circuit model reflecting the mechanical components converted to the electrical domain. This is similar to the equivalent circuit model of a traditional transformer, except that a capacitor is added in parallel to the inductor. At the natural frequency of the mechanical system, the inductor and the capacitor cancel out. This is equivalent to making the magnetizing reactance term in a traditional transformer infinite. FIG. 6C shows the equivalent circuit for the resonance behavior in the magnetic domain. Here, a "magnetic inductor" $L_{mag}$ is introduced.

Figure 7A:
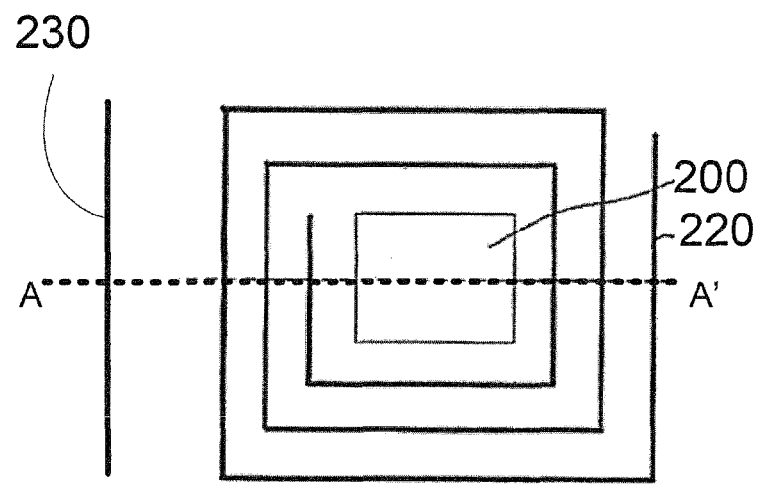
FIGS. 7A and 7B show a conceptual view of a resonating transformer in accordance with an embodiment of the present invention.
Figure 7B:
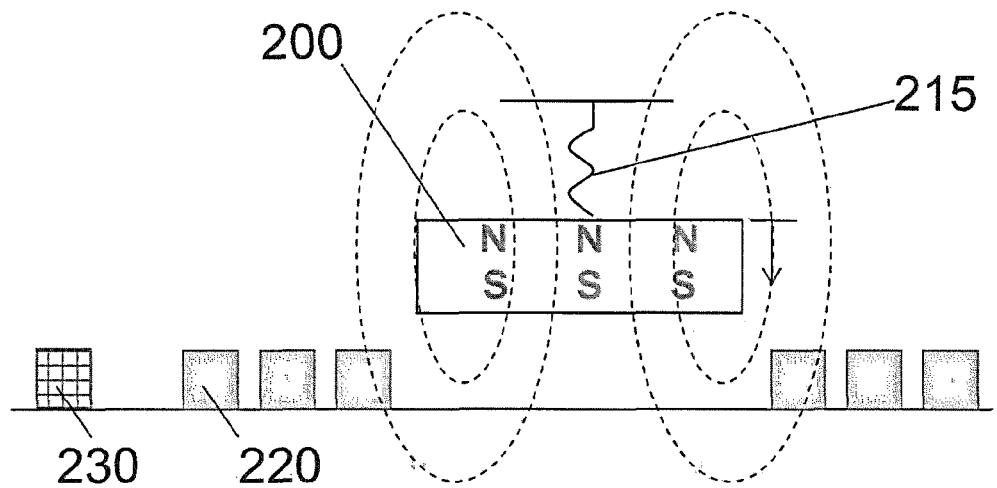

FIGS. 7A and 7B show a planar and cross-sectional view, respectively, of a resonating transformer in accordance with an embodiment of the present invention. According to one embodiment, magnetic material 200 is configured to move at a position corresponding to the center of a first planar spiral coil 220, which functions as a conductor of the resonating inductor. A spring 215 or other tether can be used to allow movement of the magnetic material. In operation, when current flows in the coil 220, a magnetic force attracts or repels the magnetic material 200, depending on the direction of current. The resulting motion acts to increase or decrease the flux in the coil 220, resulting in an apparent boost in inductance. A second coil 230 is disposed nearby to the magnetic material 200 and first planar spiral coil 220, which induce a varying electromotive force in the second coil 230. In one embodiment, the second coil 230 is fixed (or formed) on a substrate 240 having the first planar spiral coil 220.

Figure 8:
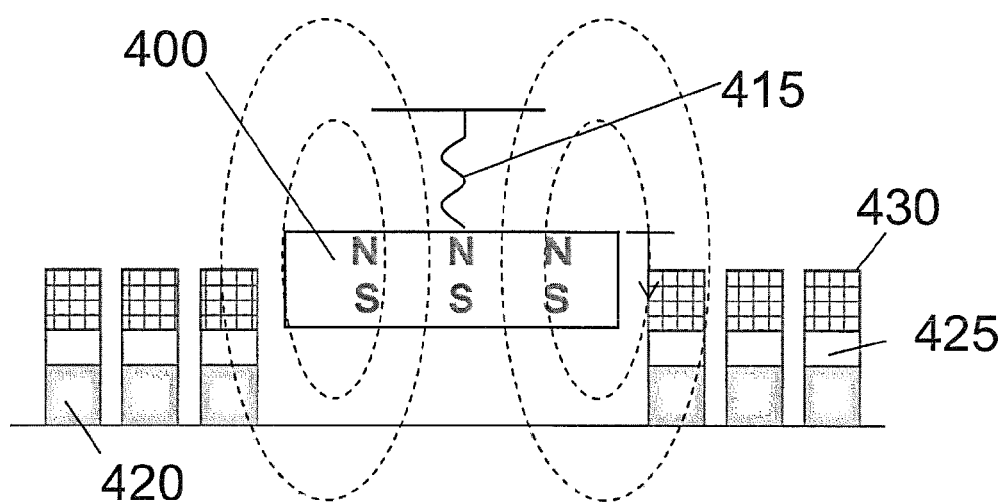
FIG. 8 shows a cross-sectional view of a resonating inductor in accordance with an embodiment of the present invention.

FIG. 8 shows a cross-sectional view of a resonating inductor having a magnet 400 (or magnetic material) attached to a spring 415, where the second coil 430 is arranged above the first coil 420. The first coil 420 can be formed (or fixed) on the substrate 440 and the second coil 430 can be formed (or fixed) on the first coil 420 with a dielectric 425 or other insulating material therebetween. The second coil 430 can be disposed on the entire first coil 420 or a portion of the first coil 420. In one embodiment, the second coil 430 can have additional windings that are not aligned on the windings of the first coil 420.

Figure 9A:
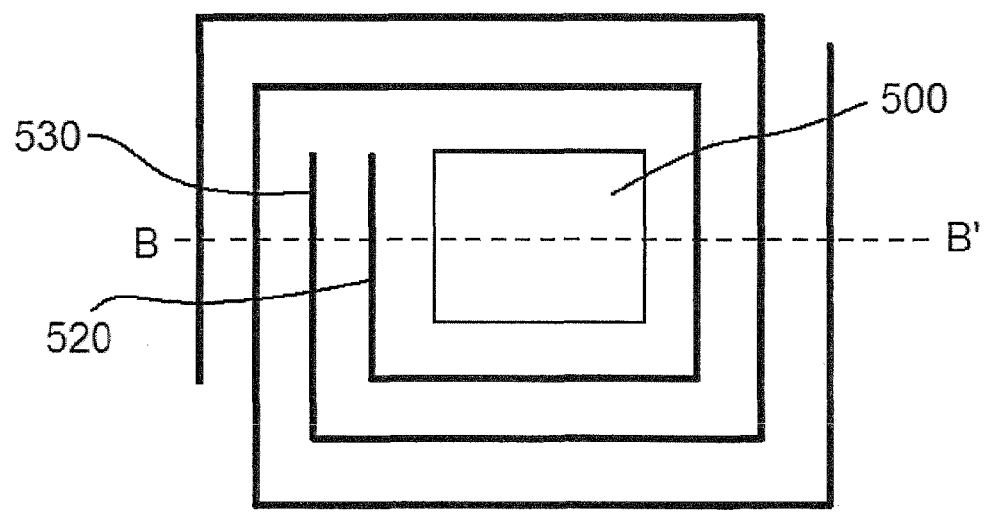
FIGS. 9A and 9B show a conceptual view of a resonating inductor in accordance with another embodiment of the present invention.
Figure 9B:
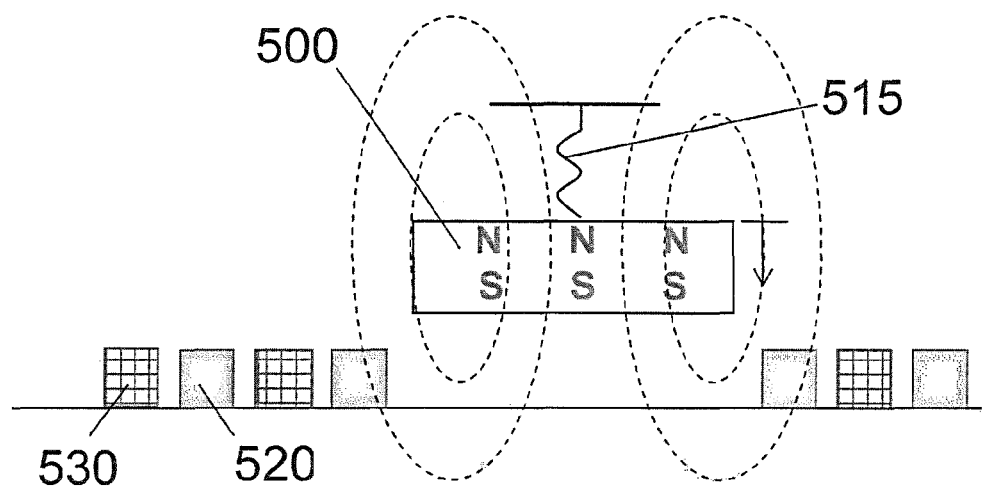
Figure 10A:
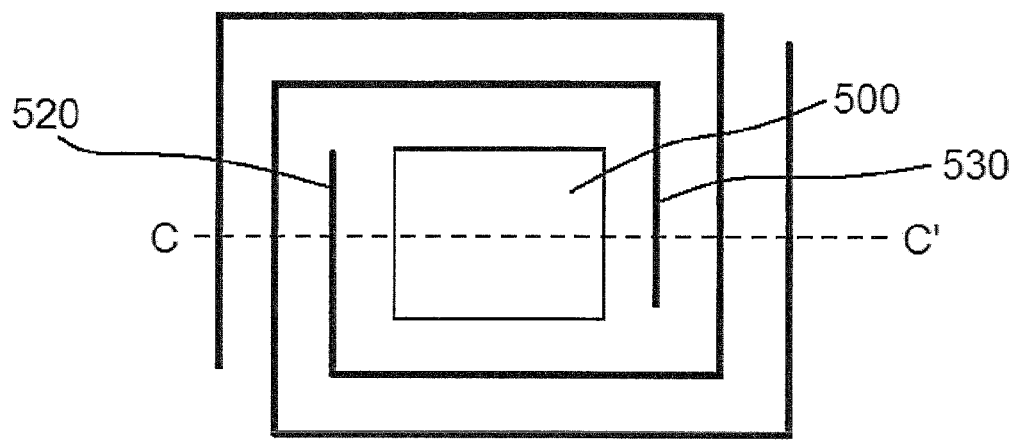
FIGS. 10A and 10B show a conceptual view of a resonating inductor in accordance with another embodiment of the present invention.
Figure 10B:
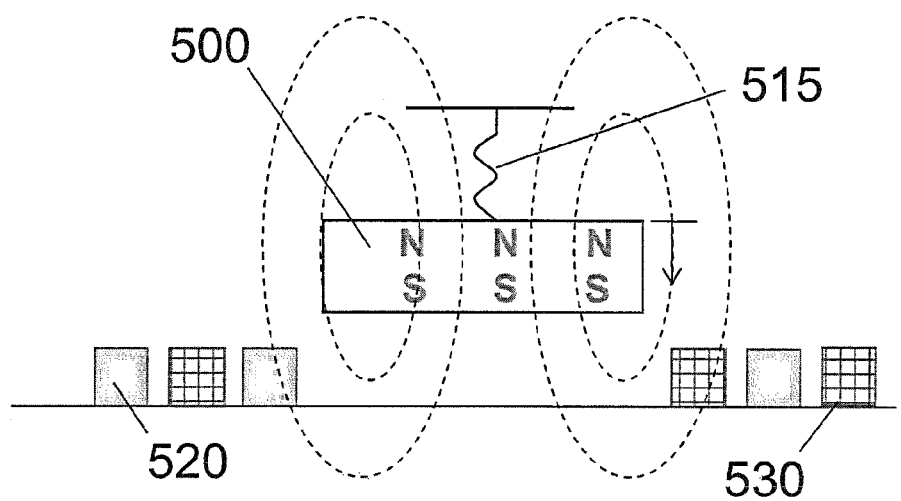

FIGS. 9A and 9B show a planar and cross-sectional view, respectively, of a resonating inductor in accordance with an embodiment of the present invention. As shown in FIGS. 9A and 9B, a first coil 520 and a second coil 530 can be disposed on a substrate 540 with their windings around a magnet 500 (or magnetic material) attached to a spring 515. The second coil 530 can be disposed within the first coil 520 such that the spirals of the coils alternate around the magnet 500. For the embodiment shown in FIGS. 9A and 9B, the coils are configured in the same direction and begin at a same side; however, embodiments are not limited thereto. In addition, FIGS. 10A and 10B show another implementation of the alternating first and second coils 520 and 530 for an embodiment where the coils are arranged in opposite direction.

In another embodiment, the second coil is fixed on a separate substrate.

In yet another embodiment, the second coil is disposed on a compliant layer or on a beam having the magnetic material such that the second coil moves with the magnetic material. The second coil can be further configured to move in addition to the movement of the magnetic material using, for example, additional fixtures, cantilevers, or springs.

In an alternate embodiment where the magnetic material is fixed on a substrate and a first conductor is arranged to allow translational or rotational motion between the magnetic material and the conductor, the second coil can be fixed to the substrate or also disposed to allow translational or rotational motion between the magnetic material and the second coil.

In further embodiments, flexures can be used to enable translational or rotational vibration modes between the magnet and conductors. In addition, a cantilever or other spring-like connection can be made with a substrate using the material of the compliant layer or another material capable of supporting the magnet while allowing the magnet to move.

Figure 11A:
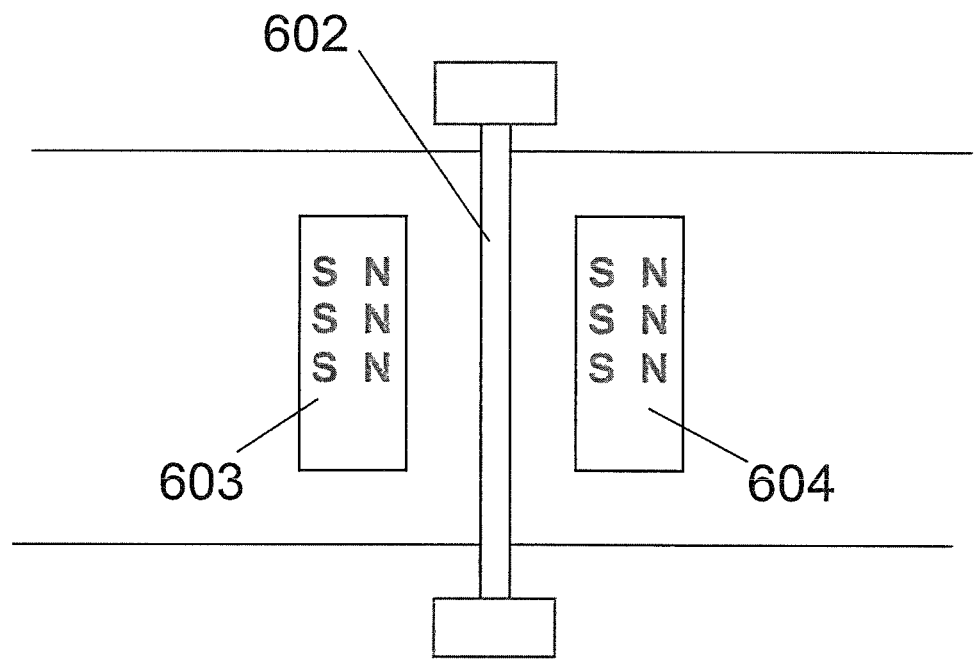
FIGS. 11A and 11B show a plan view and a side view, respectively, of a resonating inductor according to an embodiment of the present invention.
Figure 11B:
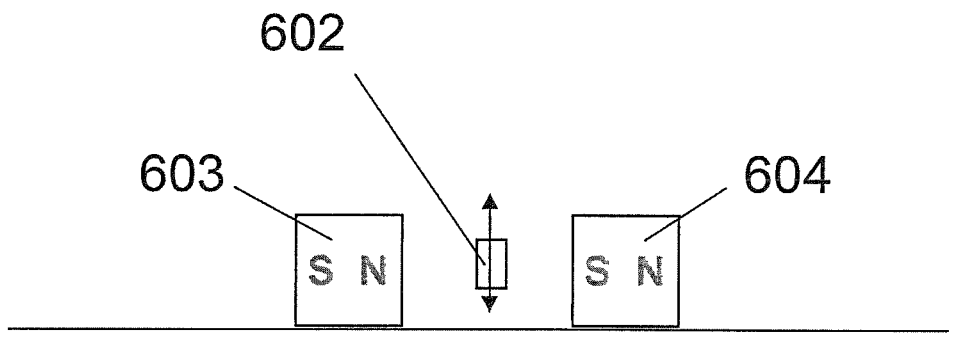

FIGS. 11A and 11B show a plan view and a side view, respectively, of a resonating inductor having a movable conductor and fixed magnet. Referring to FIG. 11A, the conductor 602 can be anchored at each end to a substrate while allowing motion such as shown in FIG. 11B. A first magnet 603 is arranged at one side of the conductor 602 and a second magnet 604 is arranged at an opposite side of the conductor 602. A magnetic field directed from the first magnet 603 to the second magnet 604 can affect the motion of the conductor. The magnets can be hard magnets or soft magnets.

Although the conductor 602 is shown having a line shape, other shapes can be used. For example, the conductor 602 can be curved.

Figure 12:
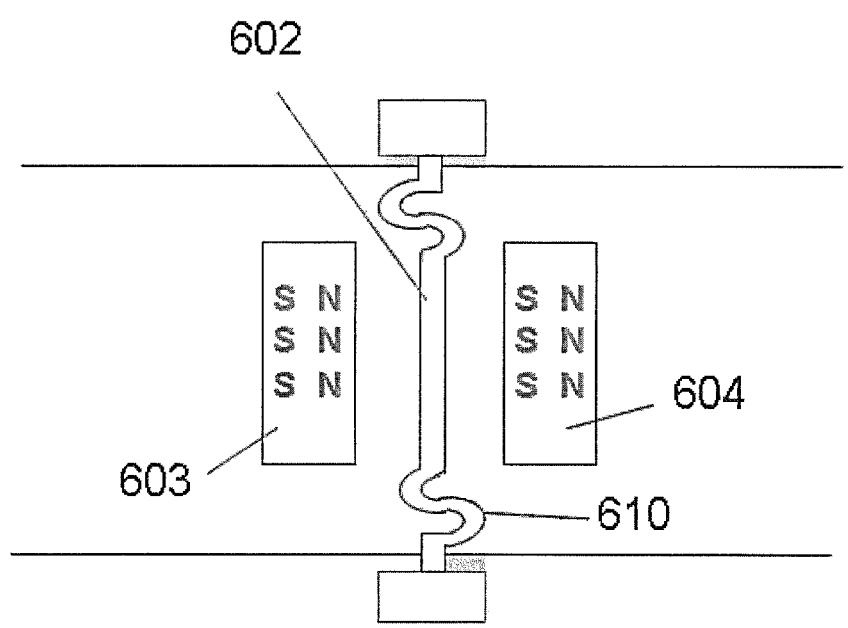
FIG. 12 shows a plan view of a resonating inductor according to another embodiment of the present invention.

In a further embodiment, as shown in FIG. 12, compliant tethers 610 can be at one or both ends of the conductor 602 to allow for additional motion and/or flexibility. In one embodiment, the compliant tether 610 at an end of the conductor 602 has an "S" shape.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to utilize or combine such feature, structure, or characteristic in connection with other ones of the embodiments.

Accordingly, examples of embodiments of the invention are provided below. These examples should not be construed as limiting.

1. A resonating inductor, comprising:
   magnetic material; and
   a conductor disposed to create a magnetic field interacting with the magnetic material, wherein the conductor and magnetic material are configured such that motion occurs between the magnetic material and the conductor to affect flux in the conductor.

2. The resonating inductor of embodiment 1, wherein the magnetic material is one or more permanent magnets.

3. The resonating inductor of embodiment 1, wherein the magnetic material is one or more soft magnets.

4. The resonating inductor of embodiment 1, wherein the conductor is in the shape of a coil.

5. The resonating inductor of embodiment 1, wherein the conductor is in the shape of a straight or curved wire.

6. The resonating inductor of embodiment 1, further comprising flexures attached to the conductor and magnetic material to enable translational or rotational motion between the magnetic material and the conductor.

7. The resonating inductor of embodiment 1, wherein the resonating inductor is fabricated as a microelectromechanical inductor.

8. The MEMI of embodiment 7, wherein the conductor is a spiral coil and wherein the magnetic material is centrally disposed in the spiral coil.

9. The MEMI of embodiment 7, wherein the magnetic material is disposed on a compliant layer on a substrate, and configured to allow movement of the magnet.

10. The MEMI of embodiment 7, wherein the magnetic material is fixed on the substrate and the conductor is configured to allow movement of the conductor. The MEMI can further include additional magnets fixed on the substrate to affect flux in the coil.

11. The MEMI of embodiment 7, further comprising flexures or a cantilever attached to the conductor or magnetic material to enable translational or rotational motion between the magnetic material and the conductor.

12. A switch-mode power converter, comprising:
a resonating inductor in series between an input voltage signal and a switch.

13. A resonating transformer, comprising:
the resonating inductor of embodiment 1; and
a second conductor disposed near the resonating inductor such that the resonating inductor affects flux of the second conductor.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A switch-mode power converter, comprising:
   a resonating inductor disposed between an input voltage signal and a switch,
   wherein the resonating inductor passively stores energy via both an electromagnetic mechanism and a mechanical mechanism,
   wherein the resonating inductor comprises a magnetic material and a first conductor, wherein the switch-mode power converter is configured such that motion occurs between the magnetic material and the first conductor and such motion alters the electrical impedance of the resonating inductor.

2. The switch-mode power converter according to claim 1, wherein the resonating inductor comprises a mechanical resonator and an electrically conducting inductive element electromechanically coupled to the mechanical resonator, wherein the electrically conducting element comprises the first conductor.

3. The switch-mode power converter according to claim 2, wherein the mechanical resonator comprises a magnetic material,
   wherein the first conductor is disposed to create a magnetic field having a flux interacting with the magnetic material, and
   wherein the first conductor and the magnetic material are configured such that motion occurs between the magnetic material and the first conductor to adjust the flux in the first conductor.

4. The switch-mode power converter according to claim 1, wherein the first conductor is a spiral coil, and wherein the magnetic material is centrally disposed in the spiral coil.

5. The switch-mode power converter according to claim 1, wherein the magnetic material is one or more permanent magnets.

6. The switch-mode power converter according to claim 1, wherein the first conductor is in the shape of a coil.

7. The switch-mode power converter according to claim 1, wherein the first conductor is in the shape of a straight or curved wire.

8. The switch-mode power converter according to claim 1, further comprising flexures, a spring, or a cantilever attached to magnetic material to enable translational or rotational motion between the magnetic material and the first conductor.

9. A switch-mode power converter, comprising:
   a resonating inductor disposed between an input voltage signal and a switch,
   wherein the resonating inductor passively stores energy via both an electromagnetic mechanism and a mechanical mechanism,
   wherein the resonating inductor comprises a mechanical resonator and an electrically conducting element electromechanically coupled to the mechanical resonator,
   wherein the mechanical resonator and the electrically conducting element comprise a magnetic material fixed on a substrate and a first conductor, and
   wherein the switch-mode power converter is configured to allow movement of the first conductor with respect to the substrate.

10. The switch-mode power converter according to claim 9, further comprising additional magnets fixed on the substrate to affect the electrical impedance of the first conductor.

11. The switch-mode power converter according to claim 9, further comprising a second conductor disposed near the magnetic material such that the magnetic material affects the electrical impedance of the second conductor, wherein the second conductor is fixed on the substrate.

12. The switch-mode power converter according to claim 1, further comprising a second conductor disposed near the magnetic material such that the magnetic material affects the electrical impedance of the second conductor.

13. A switch-mode power converter, comprising:
   a resonating inductor disposed between an input voltage signal and a switch,
   wherein the resonating inductor passively stores energy via both an electromagnetic mechanism and a mechanical mechanism,
   wherein the resonating inductor comprises a mechanical resonator and an electrically conducting element electromechanically coupled to the mechanical resonator,
   wherein the mechanical resonator comprises a magnetic material,
   wherein the electrically conducting element comprises a first conductor disposed to create a magnetic field having a flux interacting with the magnetic material,
   wherein the first conductor and the magnetic material are configured such that motion occurs between the magnetic material and the first conductor to adjust the flux in the first conductor,
   wherein the switch-mode power converter further comprises a second conductor disposed near the magnetic material such that the magnetic material affects the electrical impedance of the second conductor,
   wherein the magnetic material is attached to a spring, and
   wherein the first conductor and the second conductor are fixed on a substrate.

14. The switch-mode power converter according to claim 13, wherein the second conductor is disposed on the first conductor with a dielectric disposed therebetween.

15. The switch-mode power converter according to claim 13, wherein the second conductor is disposed on the substrate adjacent to the first conductor.

16. The switch-mode power converter according to claim 13, wherein the first conductor comprises a first planar spiral coil, and wherein the second conductor comprises a second planar spiral coil disposed between spirals of the first planar spiral coil.

17. The switch-mode power converter according to claim 1, wherein the resonating inductor is fabricated as a microelectromechanical inductor.

18. The switch-mode power converter according to claim 1, wherein the motion between the magnetic material and the first conductor increases the electrical impedance of the resonating inductor.

19. The switch-mode power converter according to claim 4, wherein the magnetic material is attached to a spring, and wherein the spiral coil is disposed on a substrate.

* * * * *

UNITED STATES PATENT AND TRADEMARK OFFICE
CERTIFICATE OF CORRECTION

PATENT NO. : 9,252,667 B2
APPLICATION NO. : 14/096099
DATED : February 2, 2016
INVENTOR(S) : David Patrick Arnold, Shuo Cheng and Christopher David Meyer Page 1 of 1

It is certified that error appears in the above-identified patent and that said Letters Patent is hereby corrected as shown below:

In the specification

Column 7

Line 7, "$Z_{tot} = R + \underbrace{\frac{G^2 b\omega^2}{(k-m\omega^2)^2 + b^2\omega^2}}_{R_{tot}} + j\omega\left\{L + \underbrace{\frac{G^2(k-m\omega^2)}{(k-m\omega^2)^2 + b^2\omega^2}}_{L_{tot}}\right\}$" should read -- $Z_{tot} = R + \underbrace{\frac{G^2 b\omega^2}{(k-m\omega^2)^2 + b^2\omega^2}}_{R_{tot}} + j\omega\left\{L + \underbrace{\frac{G^2(k-m\omega^2)}{(k-m\omega^2)^2 + b^2\omega^2}}_{L_{tot}}\right\}$ --.

Signed and Sealed this
Twenty-third Day of August, 2016

Michelle K. Lee
*Director of the United States Patent and Trademark Office*